United States Patent [19]

Rivers et al.

[11] Patent Number: 5,754,323
[45] Date of Patent: May 19, 1998

[54] POINT-TO-POINT LASER COMMUNICATION DEVICE

[75] Inventors: Michael D. Rivers, Santee; Scott H. Bloom, San Diego; Victor Chan, San Diego; James Menders, San Diego, all of Calif.

[73] Assignee: ThermoTrex Corporation, San Diego, Calif.

[21] Appl. No.: 221,527

[22] Filed: Apr. 1, 1994

Related U.S. Application Data

[63] Continuation-in-part of Ser. No. 935,899, Aug. 27, 1992, and Ser. No. 199,115, Feb. 22, 1994.

[51] Int. Cl.$^6$ .................................................. H04B 10/00
[52] U.S. Cl. ................................................. 359/152; 359/159
[58] Field of Search .................................. 359/144, 145, 359/146, 154, 167, 172, 159, 152

[56] References Cited

U.S. PATENT DOCUMENTS

| | | | |
|---|---|---|---|
| 4,091,273 | 5/1978 | Fuller et al. | 359/170 |
| 4,567,446 | 1/1986 | Konishi | 330/308 |
| 4,605,959 | 8/1986 | Colbaugh | 358/93 |
| 5,005,213 | 4/1991 | Hanson et al. | 359/144 |
| 5,181,135 | 1/1993 | Keeler | 359/141 |
| 5,202,741 | 4/1993 | Snyder | 356/4 |
| 5,253,095 | 10/1993 | Menaclier et al. | 355/152 |
| 5,267,010 | 11/1993 | Kremer et al. | 356/5 |
| 5,339,189 | 8/1994 | Boczar | 359/326 |

FOREIGN PATENT DOCUMENTS 2079088  1/1982  United Kingdom ............ 359/172

OTHER PUBLICATIONS

Long–range noncoherent laser Doppler Velocimeter, Bloom et al. Optical Letters/vol. 16, No. 22/ Nov. 15, 1991 pp. 1794–1796.

*Primary Examiner*—Wellington Chin
*Assistant Examiner*—Rafael Bacares
*Attorney, Agent, or Firm*—Fish & Richardson P.C.

[57] ABSTRACT

For transmitting information via laser beams to and from other similar laser communication transceivers. Each transceiver comprises a wavelength locked beacon laser providing a beacon beam. The transceivers determine the precise location of other transceivers by detecting these beacon beams with beacon receive units comprising atomic line filters matched to the beacon wavelength. Signals are transmitted by imposing an electronic signal on laser beams produced by one or more signal laser devices. These signals are directed with precision at other transceivers, and the signal beams are detected with very narrow field of view signal receive units. In a preferred embodiment, these transceivers are installed on 66 satellites in low earth orbit and on selected mountain tops on earth to provide a global communication system.

8 Claims, 8 Drawing Sheets

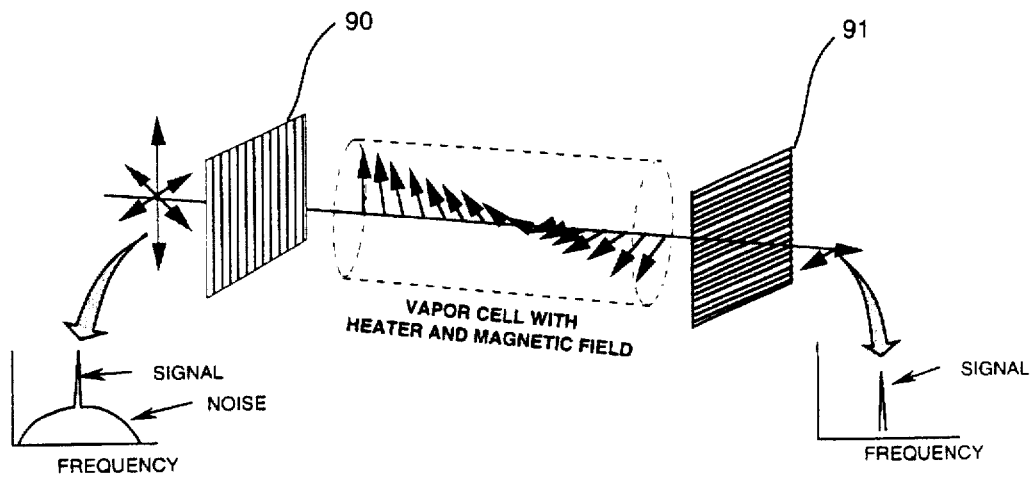
Fig. 7B     Fig. 7A     Fig. 7C
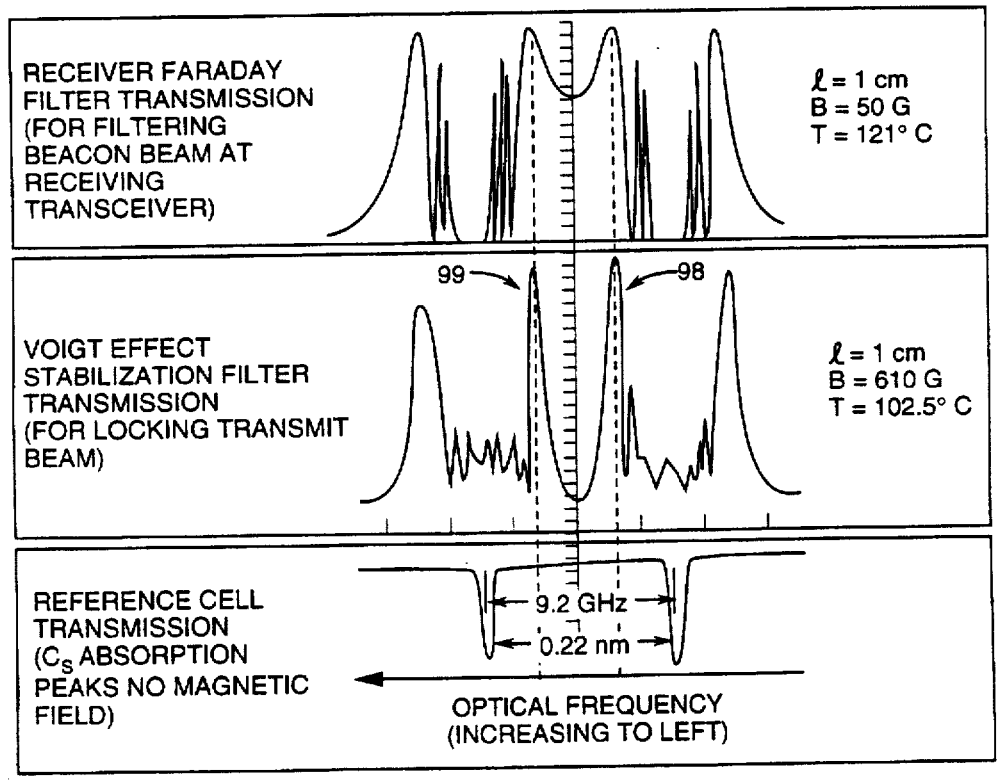

POINT-TO-POINT LASER COMMUNICATION DEVICE

This invention relates to communication systems and in particular to laser communication transceivers. This application is a continuation-in-part application of Ser. No. 07/935,899, entitled "Voigt Filter" filed Aug. 27, 1992 and of Ser. No. 08/199,115 entitled Laser Communication Transceiver and System filed Feb. 22, 1994.

BACKGROUND OF THE INVENTION

Free space laser communication originated in the mid-1960's shortly after the generation of light by the first lasers. The first successful laser communication up-link to space was achieved during a series of experiments conducted by NASA in the late 1960's using a ground based argon laser transmitting to a photomultiplier optical receiver feeding data to an rf down link. Information was sent by Morse code at about one-half bit per second. A limiting factor on free space laser communication is the presence of background light, mostly reflected sunlight. Efforts have been made to develop very narrow-band filters matched to the operating wavelengths of available light weight dependable lasers. Some of these efforts are disclosed in "Selected Papers on Free-Space Laser Communication", SPIE Milestone Series, Vol. MS30.

What is needed is a laser handheld communication transceiver device which could be used to transmit information point to point over distances ranging from a few feet to several kilometers.

SUMMARY OF THE INVENTION

The present invention provides a laser communication transceiver for transmitting and receiving information imposed on laser beams. A communication signal is imposed on a very narrowband laser beam produced by a diode laser which is wavelength locked with an atomic line filter. The beam is directed by an operator, sighting through a viewing device, at a similar distant transceiver. The distant transceiver detects the communication signal by filtering the beam through an atomic line filter matched to the very narrow wavelength of the signal beam. The filters block essentially all out of band background light so that midday communication over many kilometers is feasible.

In a preferred embodiment, the transceivers are handheld and each comprises a microphone and earphones allowing operators to talk with each other. Information can also be transmitted from personal computers at the location of each operator. This transceiver weighs less than 1.3 pounds, uses less than 12 Watts of electrical power and can transmit in excess of 1 million bits per second at distances of up to 25 km through the atmosphere. At these data rates voice, and data transmission are all feasible. These transceivers can be used for communication; ground to ground, ground to air, air to air, ship to ship and ship to air. A preferred embodiment provides for secure transmission.

BRIEF DESCRIPTION OF THE DRAWINGS

FIGS. 7A, 7B and 7C are drawings explaining the principal of Faraday and Voigt filters.

FIGS. 8A, 8B and 8C show transmission specter of Voigt and Faraday filters compared to absorption's spectrum of cesium.

DETAILED DESCRIPTION OF PREFERRED EMBODIMENTS

Preferred embodiment of the present invention can be described by reference to the figures.

GENERAL DESCRIPTION

Figure 1:
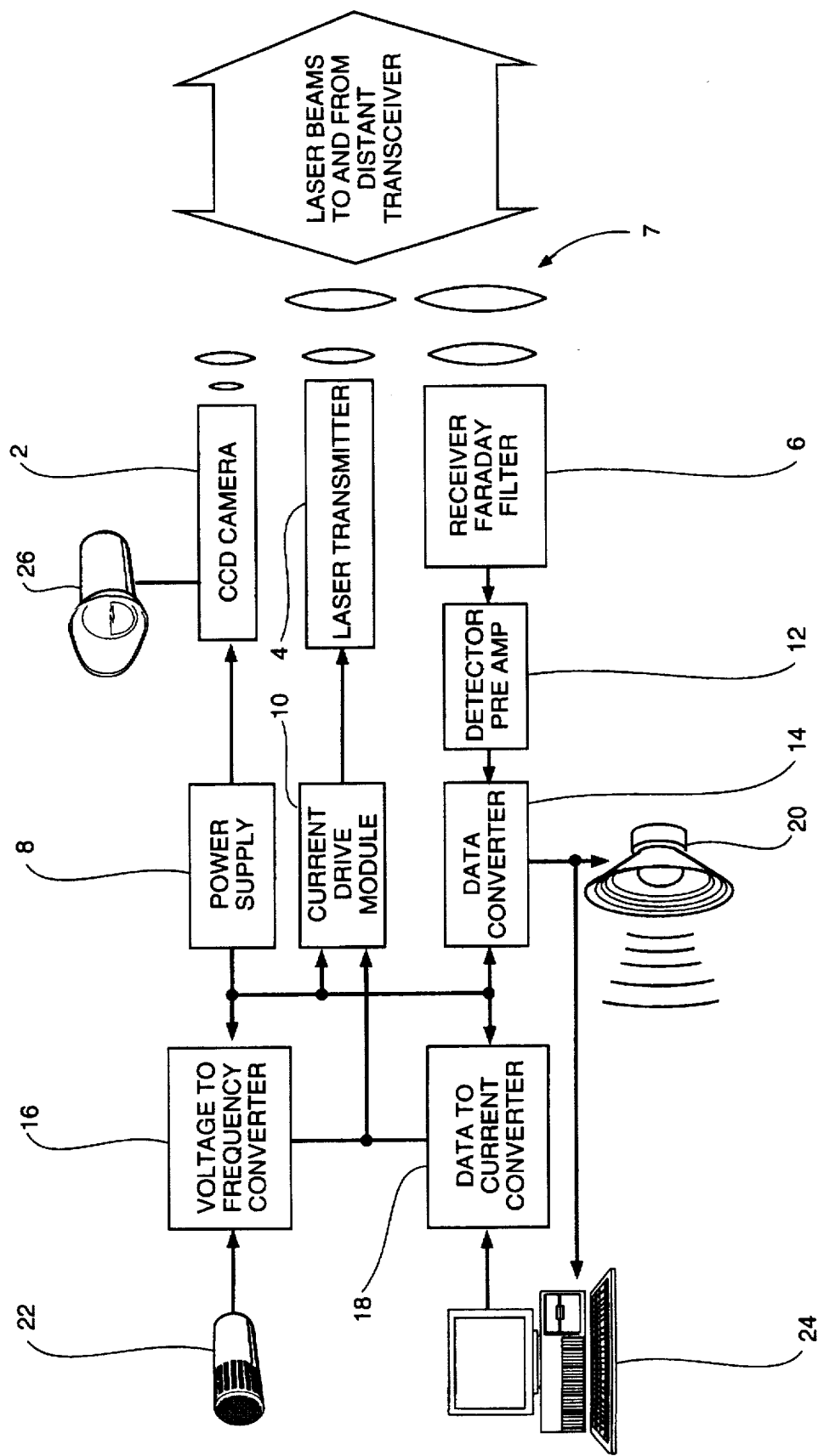
FIG. 1 is a block diagram of a preferred embodiment of the present invention.
Figure 2:
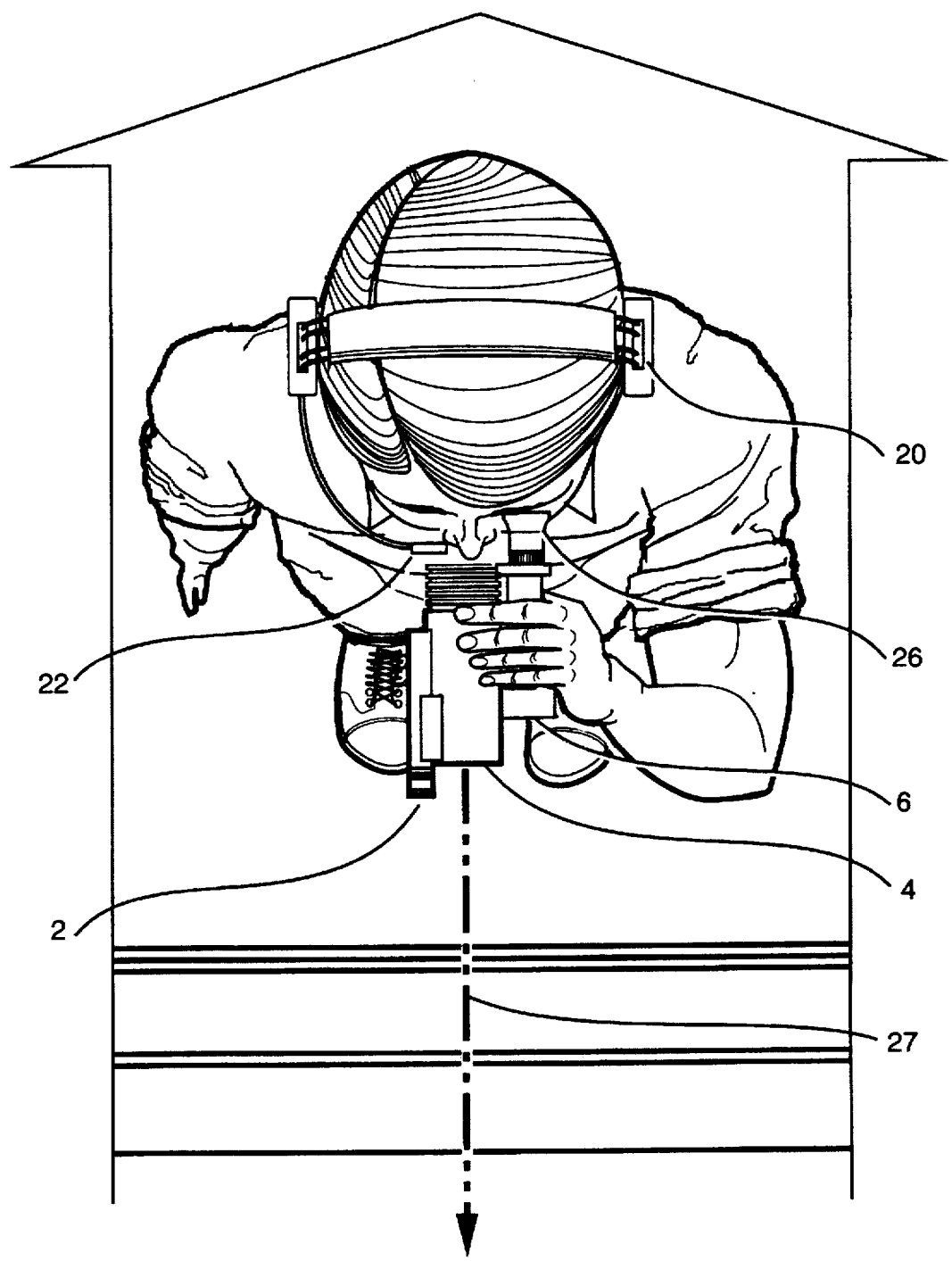
FIG. 2 is a drawing of the device referred to in FIG. 1 in use.

The general layout of one preferred embodiment of the present invention is shown in block diagram in FIG. 1 and in use in FIG. 2. The principal components are identified in these figures. These components are a CCD camera 2, a Voigt filter wavelength locked laser transmitter 4, a Faraday filter receiver 6 and an electronic viewfinder 26. Also shown as accessory components are a microphone 22 and an earphone/speaker 20.

Wavelength Locked Laser Transmitter

Figure 3:
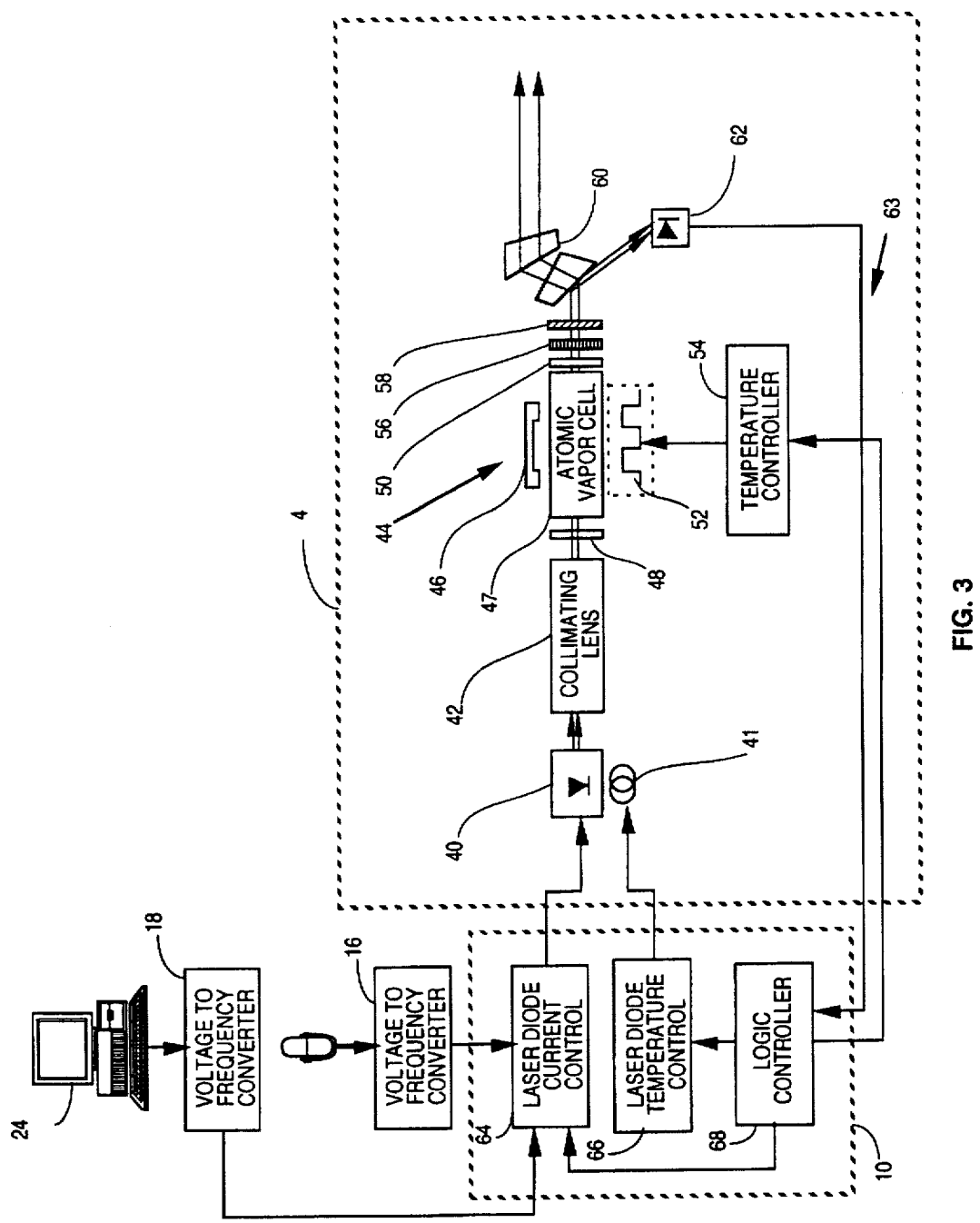
FIG. 3 is a block diagram showing the components laser transmitter referred to in FIG. 1.
Figure 4:
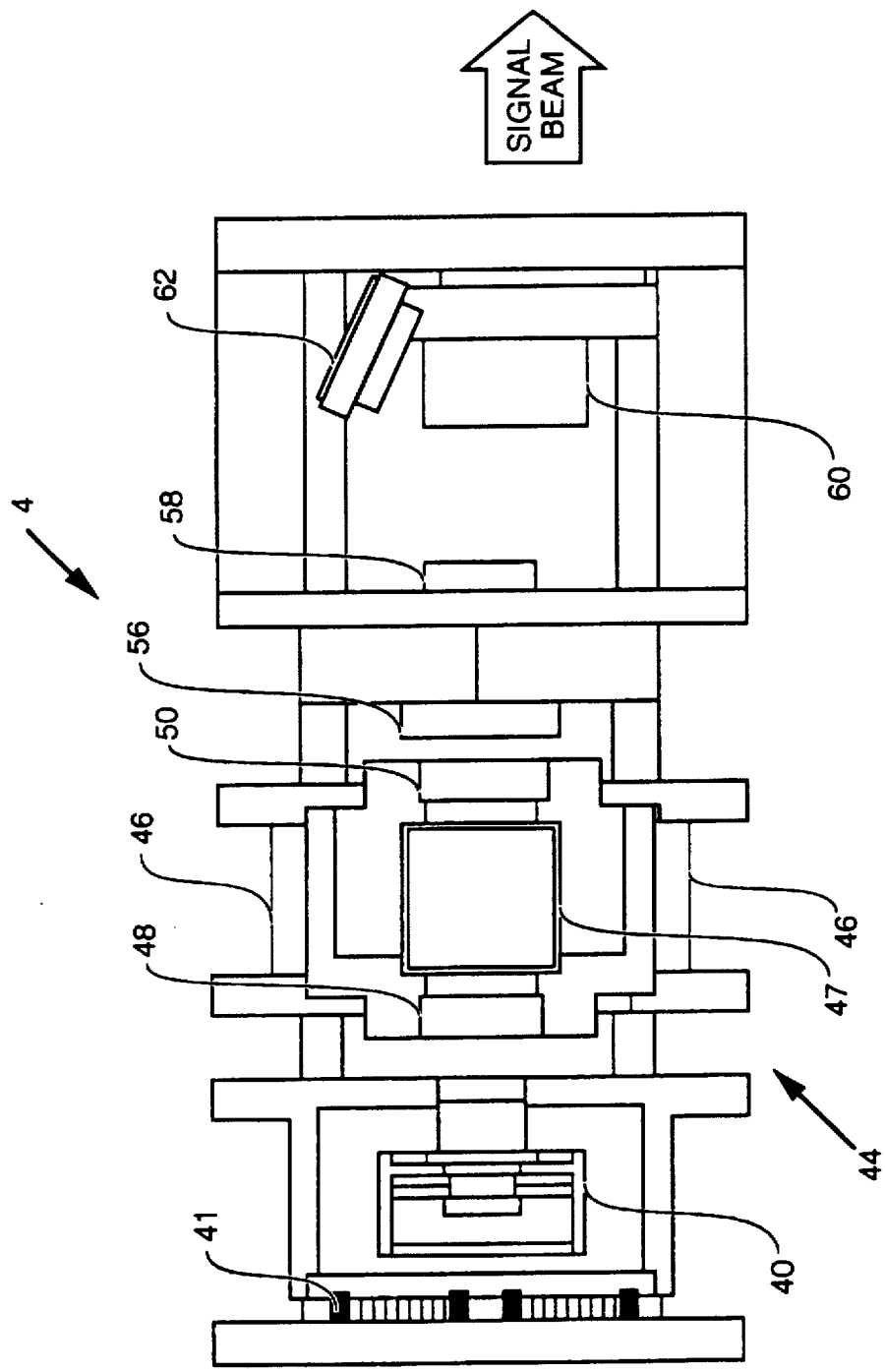
FIG. 4 is a cross section drawing of the above transmitter.
Figure 5:
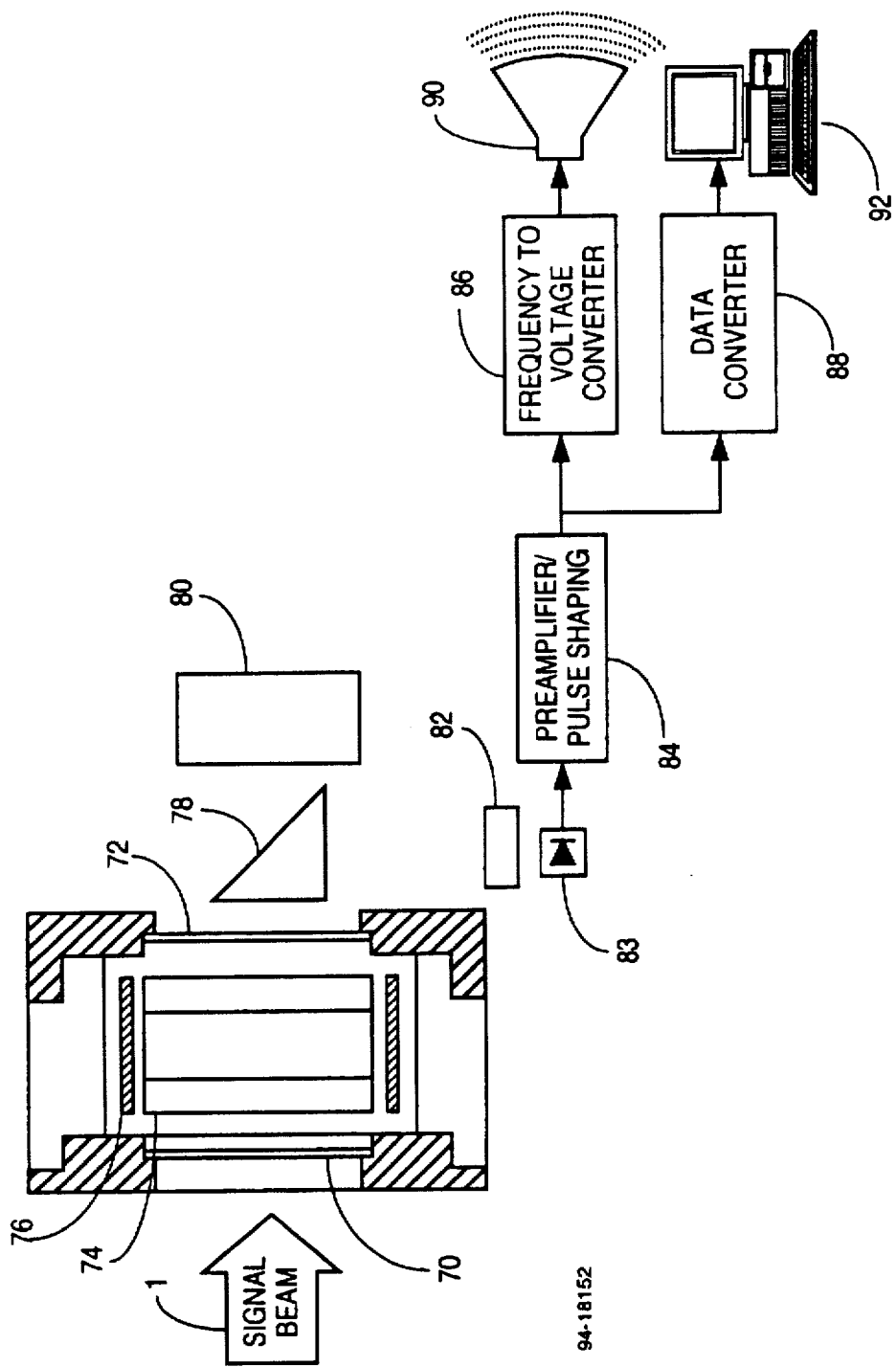
FIG. 5 is a part cross section drawing part block diagram showing the receiver module of the above preferred embodiment.
Figure 6:
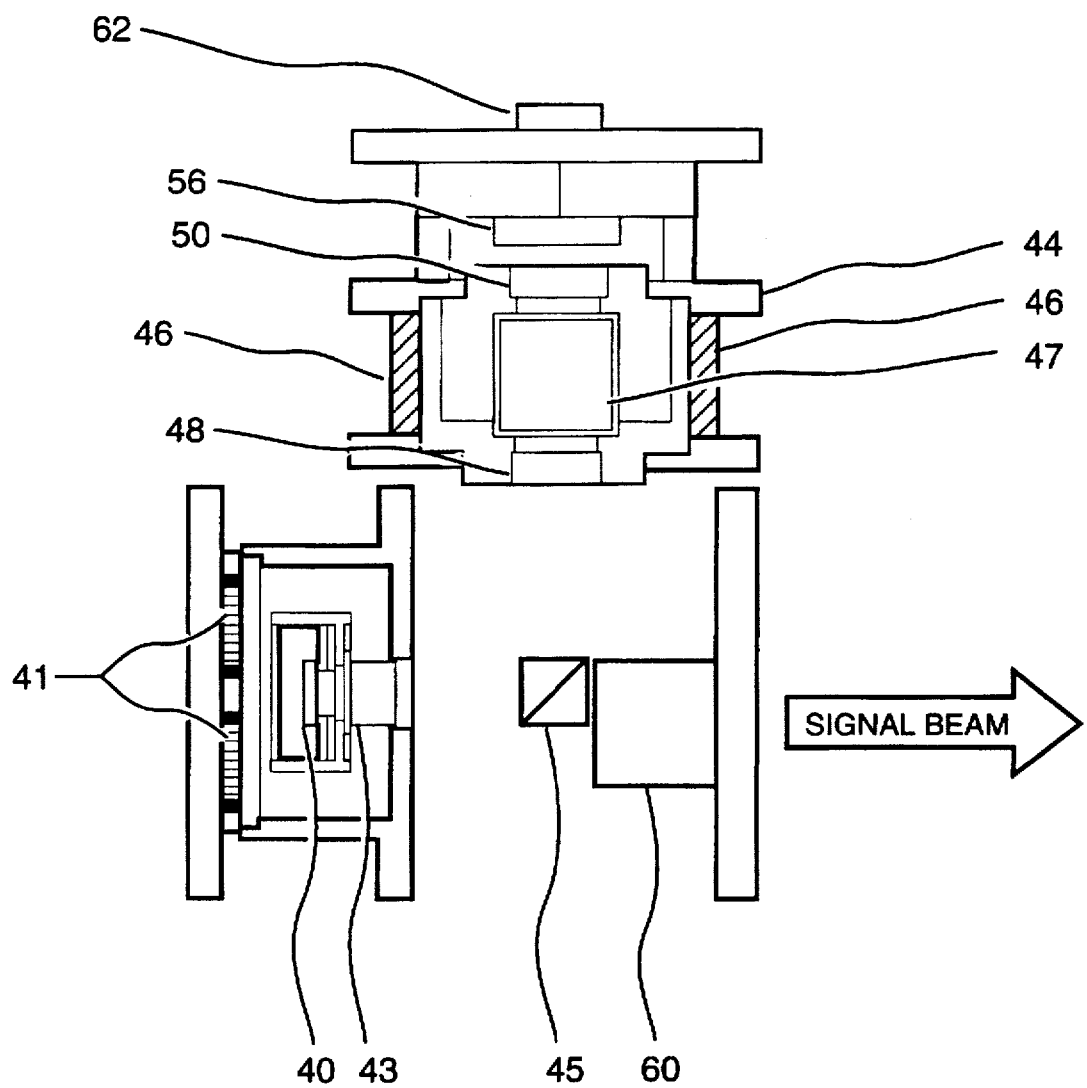
FIG. 6 is a cross section drawing of a side-locked transmitter of a second embodiment of the present invention providing for additionally secure transmission.

The elements of transmitter 4 are described in FIG. 5, 3 and 4. A laser beam is provided by 150 mWatt diode laser 40 supplied by SDL. This laser with appropriate shaping optics produces a beamwidth divergence of 2 mrad and operates nominally at 852 nm wavelength. In this preferred embodiment, we lock the laser at one of the precise wavelengths at or very near 852.11 nm, which corresponds to the $6s_{1/2}6p_{3/2}$ transition in cesium. To do this, the laser system is configured into a wavelength controlled unit as shown in FIG. 3. This control is achieved using temperature control and current control of the laser and a Voigt filter 44. The control of the laser is provided by heating and cooling element 41 and temperature controller 66. The output of diode element 40 passes through lens assembly 42 and through Voigt filter 44. Voigt filter 44 is similar to a Faraday atomic line filter except the magnetic field is at right angle to the beam direction. (The Voigt filter is described in more detail in a following section of this specification.) A magnetic field produced by permanent magnets 46 at right angle to the laser beam operates on an atomic vapor (in this case cesium at about 100° C.) in order to provide four extremely narrow pass bands near 852 nm as shown in FIG. 8B. Crossed polarizers 48 and 50 stop essentially all light which does not have its polarization rotated within the filter. The polarization of light near the atomic resonance is rotated 90° within the filter. Feedback mirror 56 passes 80 percent of the light incident on it and reflects 20 percent. The 20 percent of the light is reflected back into diode laser 40 forcing it to lock at the selected wavelength. The light beam passing through feedback mirror 56 passes through additional optics to convert the beam to a circular polarization. These optics consists of a ½ wave plate 58 to rotate the polarization to match an anamorphic prism pair 60 which circularizes the beam. The resulting output of each beacon is a 100 mW circularly polarized laser beam with a wavelength of 852.11 nm and a divergence of about 2 mrad. (This divergence results in a footprint with a 10 m diameter at a distance of 5 km.). A feedback circuit 63 is provided to control the diode current and maintain the output at the selected precise wavelength.

The laser diodes we use are provided by SDL, Model No. SDL 5421-G1. The temperature of the diode is regulated by two Melcor FC 0.6-65-06-1 thermoelectric heat pumps. The heat pumps are driven by a Hytek Microsystems HY-5610 thermoelectric cooler controller. The temperature of the laser diode is maintained to within ±0.05° C. of the required temperature for optimum wavelength stability. The laser diode is driven by a low noise, voltage controlled current source. The current source used to drive the laser diode is one from Industrial Laser Inc., Model LD 1250CC. The laser diode output is collimated with a Rodenstock 1403.108 lens and passes through the Voigt filter. The temperature of the cesium vapor cell is controlled by a Dawn Electronics model DN505 subminiature proportionally controlled heater epoxied to the vapor cell body. The temperature is maintained at 102.5° to achieve the proper transmission spectrum. The transverse magnetic field of 610 gauss is supplied by two magnets (Dexter Permag #ND35570048) located on either side of the vapor cell. The field is oriented 45° to the polarization of laser light and 90° to the beam direction. Corning 900-HC crossed polarizers stop all light which does not have its polarization rotated 90° within the filter. A CVI PRI-850-20-0537 partially reflective mirror is used to pass 80% of the light incident on it and reflect 20%. A CVI QWPO-850.0-05-2 half wave plate is used to rotate the polarization by 90° so that the polarization is perpendicular to the long axis of the laser light. This is necessary because a Melles Griot 06-GPA-004 anamorphic prism pair is used to circularize the elliptical laser light. The input of the anamorphic prism pair is at Brewsters angle and there would be a 50% loss in light if the polarization were not corrected. A small portion of the laser light is reflected off the input surface of the anamorphic prism pair. An Advanced Photonix SD-1004121231 amplified photodiode 62 is used to detect this reflected light. The signal is used for closed loop control of the laser transmitter output and wavelength.

The microcontroller 68 is used to monitor and control all functions of the laser transmitter. Upon power-up it insures that no modules are enabled, the shutter is closed and all supply voltages are present. After a period of two seconds it will accept a laser enable command. When the enable command is received the locking and receive oven heaters and the thermoelectric heat pump will be enabled. When the microcontroller senses the locking oven has reached 80° C. the laser diode current drive module will be enabled. This will allow the electronics to be stabilized when the locking filter has reached its operating temperature of 102.5° C. When the oven reaches 95° C. the microcontroller will ramp the laser diode drive current up and down by driving a sixteen bit up/down counter. The counters output is connected to a digital to analog converter whose output drives the input of the voltage controlled current source. The current source 64 is an Industrial Laser Inc. model LDC-1250 current driver. Output monitor photodiode is digitized and sent to the microcontroller 68. The microcontroller will drive the laser diode current up or down searching for the peak output as sensed by the output monitor photodiode. Once the maximum output is detected the microcontroller will then control the output drive current to maintain maximum light output from the laser assembly. The output of the laser is sampled every ten microseconds and compared with the previously sampled output and the current is changed to maintain a constant output if there is a difference of ±5 percent or more. If the current controller does not detect any light output from the laser it will then change the temperature of the laser diode in one half degree increments above and below the predetermined set point of the laser till light is detected from the laser. At that point the peak power output algorithm is initiated. In between the laser output signal conversions the laser temperature and oven temperature are digitized and stored. This is done to note any fault conditions and so that the previous operating conditions will be stored and used the next time the transceiver is used. This will decrease warm up time by using previously known operating conditions. The laser current is also digitized and stored for the same reason.

Voltage Frequency Converter

Figure 9:
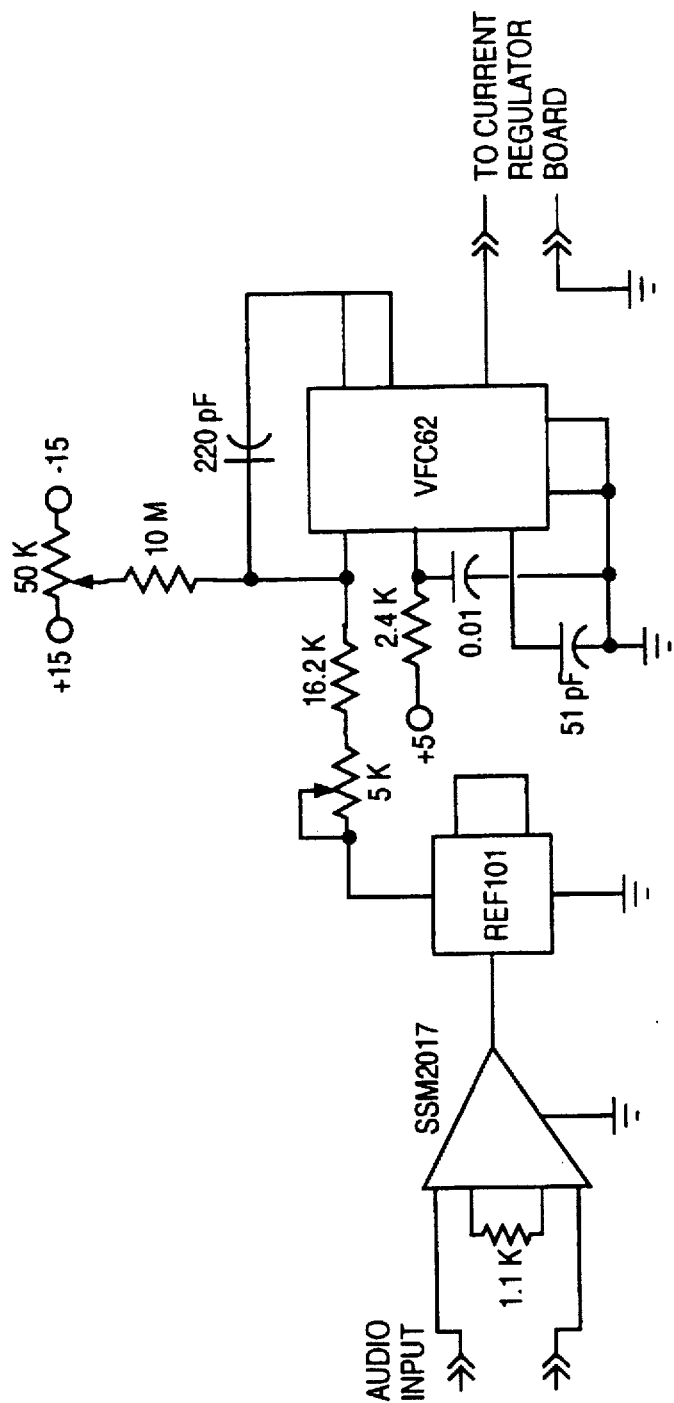
FIG. 9 is a schematic of a voltage to frequency converter.

FIG. 9 is a schematic of voltage to frequency converter. This circuit provides a digital pulse train output whose repetition rate is directly proportional to the analog input voltage. The analog microphone input is converted to a five volt digital output. The output frequency will vary around the center frequency of 50 kilohertz as to the analog modulation applied. With a voltage to current scaling factor of 40 millivolts per milliampere, the five volt digital is scaled to 200 millivolts (5 mA). This 200 millivolt (5 mA) digital signal is then summed with the steady state laser diode drive current. The result is that for each signal pulse the wavelength of the laser beam is shifted off the transmission peak so that there is no transmission. The net result is the transmission of a digitally modulated laser beam as shown at 27 in FIG. 2.

Data Interface

The input from a terminal or host computer can also be transmitted by the laser. This involves converting the data format to a TTL (0 to 5 volt level) and then shifting it to the 200 millivolt level required to shift the laser wavelength. In this instance it was decided to use the RS-232 format for data transfer, though any number of data formats could have been selected. A Maxim #MAX-233 RS-232 to TTL converter integrated circuit board was used in this device because it requires few support components.

RECEIVER UNIT

The principal element of the receiver unit of embodiment shown in FIGS. 1 and 2 are shown in block and cross section form in FIG. 5. Signal beam 1 enters Faraday filter unit 6 through polarizer 70 which polarizes the light in a horizontal direction. An axial magnetic field created by magnet 80 operating on cesium vapor heated to about 102° C. by heater 76 in vapor cell 74 causes a rotation of only that portion of the light spectrum at wavelengths near sharp Cs absorption lines near 852 nm. That light which was so rotated passes through vertical polarizer 72 and is reflected off mirror 78 onto an Advanced Photonix APM-20 avalanche photodiode 83. Other light is blocked by vertical polarizer 72 and 852 nm narrowband filter (Andover #850FS40-12.5) 82. The detected signal is amplified, shaped then converted to a TTL level by pulse shaper 84. At this point depending whether this was a voice or data transmission the received signal will be processed by a frequency to voltage converter 86 for an audio presentation through speaker 90 or to an RS-232 converter 88 for input to a personal computer 92. If the signal was a data transmission then it would be converted to a RS-232 level by a Maxim MAX-233 integrated circuit. If the signal is audio, we use a Burr-Brown VFC-62 integrated circuit.

SIDE LOCKED LASER

The advantage of the in line locked laser and the side locked laser transmitters is that only a very small modulation current is required to modulate the lasers. With the in line locked laser as the wavelength is shifted out of the passband of the locking filter there will be no signal output. If the signal is intercepted the digital modulation would easily be detected.

The side locked laser has the added feature of a continuous output signal with no apparent form of modulation. The theory of operation is as follows. The laser current drive source, laser temperature control, and oven temperature heating and control are identical to the type used in the in-line transmitter described previously. The laser light emitted from the laser diode assembly 40 is collimated and passes through a nonpolarizing beamsplitter 45. Fifty-five percent of the light is transmitted and circularized by an anamorphic prism pair. The remaining 45% of laser light is turned 90° and directed through a Voigt filter. The light that is in the passband of the Voigt filter 44 is passed through the filter and onto a mirror 57 which reflects about 90% of the light. The mirror is aligned such that the light is reflected back through the locking filter onto the beamsplitter and back onto the laser diode. The light then forces the laser to lase at the transmission peak of the Voigt filter. A small portion of the light that is incident upon the feedback mirror is not reflected but passes through the mirror. This light is detected by a photodiode and used to control the output power and wavelength of the laser in the same manner as that of the in-line filter. Because the locking filter is not in line with the transmitter laser light, and the light is shifted out of the passband of the Voigt filter is not blocked by the filter providing a continuous output.

Faraday and Voigt Filters

Operational principles of our Faraday filter can be understood by reference to FIGS. 7A–C. Crossed polarizers 90 and 91 serve to block out background light with a rejection ratio better than $10^{-5}$. We use high transmission polarizers which have a transmission of higher than 95%. Because these polarizers only work over a limited wavelength region in the infrared, a broad band interference filter is used in conjunction with the Faraday filter. Between the polarizers an atomic vapor (in this case cesium having a strong resonance near the wavelength of the beacon beam) in a magnetic field axially aligned with the path of the beam rotates the polarization of the beacon laser signal by 90°, while leaving other wavelengths unrotated, and thus blocked by the polarizers. The path of the transmitted light is unaffected, so spatial information is maintained.

Polarization rotation is due to the separation in optical absorption frequencies for right and left circularly polarized light in the magnetic field due to the Zeeman effect. The index of refraction of the vapor near an absorption is different from 1, and the absorption separation causes the index to be different for right and left circular polarization at a given frequency, and thus those polarizations travel through the vapor with a different phase velocity. The effect of this is to cause a frequency dependent rotation in the polarization of the incoming linearly polarized light which only occurs near the atomic absorption peak. Transmission through the filter is maximum where the polarization rotation is 90°, 270°, etc., provided that the frequency of the beam is far enough away from the atomic resonance not to be absorbed. The Voigt filter is similar to the Faraday filter. In the Voigt filter, magnetic field is arranged so that the field lines are perpendicular to the beam direction. The vapor acts like a half wave plate rather than a Faraday rotation to achieve 90° polarization rotation. Transmission spectra in the range of 852 nm for cesium for the Faraday filter is shown in FIG. 8A and that for the Voigt filter is shown in FIG. 8B. (This spectrum is saturated with the laser power used in the locked beacon.) Note that the transmission peaks are much sharper in the Voigt filter as compared to the Faraday filter. We use this to our advantage when we pick the Voigt filter to lock our beacon transmitter laser and when we pick the Faraday filter for use in our receiver unit. This allows us to accommodate for Doppler shifts due to relative velocities of the satellites. In our preferred embodiment we can operate one of our beacon lasers at the lower frequency designated as 98 in FIG. 8B and the other one at the higher frequency 99. This allows us to accommodate both approaching and receding satellites. If we know the receiving satellite is approaching we can set both beacons at the lower peak 98. The transmission spectrum for cesium vapor absent a magnetic field is shown in FIG. 8C. The path length through the cesium vapor is 1 cm in both cases. The Faraday filter is operated at a temperature of 121° C. and in a magnetic field of 50 gauss as shown on the figure. The Voigt filter is operated at 95° C. and 600 G.

While the above description contains many specifics, the reader should not construe these as limitations on the scope of the invention, but merely as exemplifications of preferred embodiments thereof. Those skilled in the art will envision many other possible variations are within its scope. For example, persons skilled in the art will be able to make changes appropriate for communicating over shorter or longer distances than those referred to in the examples. Based on the application of the transceiver appropriate telescope or other lens equipment can be added to the transmitter unit, the receiver unit added to the transmitter unit, the receiver unit and the video unit as shown at 7. Accordingly the reader is requested to determine the scope of the invention by the appended claims and their legal equivalents, and not by the examples which have been given.

We claim:

1. A laser communication transceiver for transmitting information via laser beams to other laser communication transceivers and for receiving information via laser beams from other similar laser communication transceivers, a straight line between a transmitting transceiver defining a communication line, said transceiver comprising:

A) a laser transmitter system comprising:
1) at least one wavelength controlled laser means for producing a narrowband signal laser beam, said wavelength controlled laser means comprising a laser and a transmitter atomic line filter,
2) a signal modulation means for modulating said signal laser beam to impose a communication signal on said laser beam, B) a laser receiver means coaligned with said laser transmitter system for receiving laser communication said laser receiver means comprising:
1) a receiver atomic line filter matched to said narrowband signal laser beam,
2) a signal detector means for detecting communication signals transmitted by one of said other laser communication transceiver and passing through said receiver atomic line filter, and C) a locating and pointing means comprising a viewing device for locating said other similar laser communication transceivers and for pointing said transceiver in the direction of said communication line.

2. A transceiver as in claim 1 wherein said transmitter atomic line filter is a Voigt filter.

3. A transceiver as in claim 1 where said receiver atomic line filter is a Faraday filter.

4. A transceiver as in claim 1 whereas said locating and pointing means comprises a video camera and an electronic view finder.

5. A transceiver as in claim 1 and further comprising a speaker.

6. A transceiver a in claim 5 wherein said signal modulation means comprises a microphone.

7. A transceiver as in claim 1 wherein said signal modulation means comprises a personal computer.

8. A transceiver as in claim 1 wherein said signal detection means comprises a photodiode, a preamplifier, a frequency to voltage converter and a data converter so that said communication signal can be detected as sound or digital data suitable for input to a personal computer.

* * * * *